Jan. 6, 1953  C. W. BERTHIEZ  2,624,099
LOCKING DEVICE FOR TOOLHOLDER CARRIAGE
OPERATING IN BOTH DIRECTIONS
Filed June 28, 1946
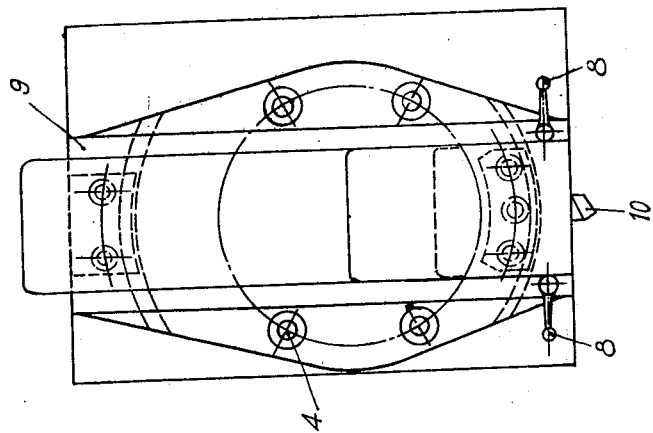
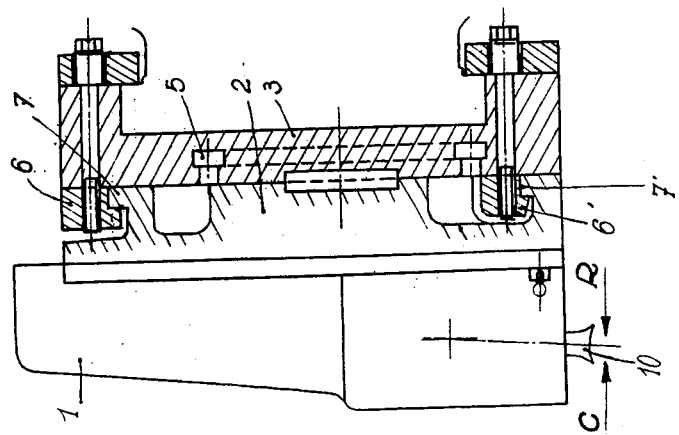
Charles William Berthiez
INVENTOR
By George H. Cavrey
His Attorney Patented Jan. 6, 1953

2,624,099

UNITED STATES PATENT OFFICE 2,624,099

LOCKING DEVICE FOR TOOLHOLDER CARRIAGE OPERATING IN BOTH DIRECTIONS

Charles William Berthiez, Paris, France

Application June 28, 1946, Serial No. 679,943
In France October 5, 1945

3 Claims. (Cl. 29—1)

In the mounting of a tool on a slotting machine, a planing machine or a shaping machine, a difficulty is met with in the case of a machine operating in both directions, when it is desired to provide a tool holder capable of resisting the cutting reaction both in the return direction, and in the forward direction at least for the finishing cuts which should lead to an accuracy of the order of two hundredths of a millimeter for the machined surface.

It is this difficulty which has rendered it heretofore impossible to execute in both directions the finishing cuts.

The method consisting in operating in both cutting directions loses entirely its advantage if there is a departure of more than two hundredths of a millimeter in the evenness of the machined surface formed between the forward and the rearward strokes.

This difficulty of constructing a tool holder allowing operation in both cutting directions with the required accuracy is all the greater through the fact that it should be possible in the case of machines, such as slotting machines, planing machines or shaping machines, to make the tool holder rock from 0 to 45° to either side of the vertical so as to allow using to their utmost the possibilities of machining in the machine tools now on the market.

The above disclosed difficulty is ascribable to the fact that the tool holder, as mounted nowadays, is not held in a position which is effective for avoiding separation of the pivoting quadrant carrying the tool holder with reference to the shoe of the carriage during the return stroke i. e. the tendency to pulling away of the shoe from the quadrant arising during this stroke.

My invention has for its object a special device for clamping the tool holder carriage operating in both directions in order to avoid the drawback which has just been mentioned and to allow a highly accurate machining with tools operating in both directions.

This clamping system is chiefly characterized through the fact that the pivoting quadrant carrying the tool holder is clamped adjacent its edge as near as possible to the cutting edges of the tool when considered in projection on a plane perpendicular to the surface to be machined.

My invention shows, moreover, the following features considered, by way of example, in relation to a tool holder supported for pivotal movement in a vertical plane upon a horizontal axis:

Firstly, the above mentioned clamping system, securing through its lower edge the pivoting quadrant centrally positioned with reference to the carriage shoe, is associated with a central fastening device which may be formed by bolts bearing inside a circular groove of the shoe.

Secondly, this clamping system of the quadrant at its lower edge is also associated with means for clamping the upper edge.

Thirdly, the peripheral clamping of the quadrant at its lower and upper edges is executed by means of an arcuate strip or member rigid with the quadrant and coaxial therewith while lower and upper straps cooperating with said strip are bolted to the carriage shoe.

Further features and advantages of my invention will appear in the following description considered with reference to accompanying drawing illustrating diagrammatically and solely by way of example a form of execution of my invention.

In said drawing:

Fig. 1 is an elevational side view, partly cross-sectional, of a machine tool carriage executed in accordance with my invention.

Fig. 2 is an elevational front view thereof.

As apparent from examination of the drawing, the slider 1 forming the tool holder and the quadrant 2 have a tendency during the normal cutting stroke when the work piece is moved in the direction C (Fig. 1) of bearing against the shoe 3 of the carriage sliding over the cross beam, not illustrated, whereas for the opposite direction of cutting R, the slider 1 and the quadrant 2 have a tendency of moving apart from the shoe 3 unless a special clamping device is provided.

In the device of the invention there is provided in the usual manner a central fastening system including the bolts 4 (Fig. 2) the ends of which are provided with heads engaging a circular groove 5 cut in the shoe 3, said system being associated with a peripheral clamping device on the upper side of the carriage comprising a strap 6 bolted to the shoe 3 and engaging a circular flange 7 carried by the rear surface of the quadrant 2.

According to my invention, these fastening and clamping means are still further associated with a clamping means for the lower edge of the quadrant. This means lies in the vertical direction as near as possible to the cutting edges of the tool 10 operating in both directions and carried on the slider 1. The lower clamping means is similar to the upper clamping means 6 and comprises a strap 6' bolted to the shoe 3 and cooperating with a circular flange 7' the axis of which is the same as that of the upper circular flange 7, to with the pivoting axis of the quadrant.

Thus the quadrant 2 is clamped against the possibility of its moving which would allow a different positioning of the cutting tool in its forward and in its rearward stroke.

Of course, the slider 1, after adjustment, is locked in its turn to the quadrant 2 through any suitable fastening arrangement, for instance by means of levers 8 adapted to lock suitable bearing heels (not shown) on the slide against slideways 9 provided on the quadrant.

It is also obvious that the cutting tool 10 must be in its turn held in the tool holder 1 through any suitable securing and locking device such as that described in my copending application, Serial No. 587,772, filed April 11, 1945, for a Device for Fixing a Tool in the Tool Carrier of a Machine, and now Patent No. 2,466,197, granted April 5, 1949.

It should be well understood that the above described locking device which has been illustrated in the drawing has been disclosed merely by way of example and that it may receive certain modifications in its execution chiefly in order to take into account the type of machine to which it is to be applied, without the general scope of my invention being altered thereby.

What I claim is:

1. In a machine tool or the like, the combination with a supporting carriage, a quadrant pivotally mounted on said carriage, a tool holder supported on said quadrant for movement along a path extending in a plane transversely of the pivotal axis of said quadrant, and a plurality of means for releasably fastening the quadrant to the carriage, said means being positioned laterally of said tool holder and radially outward with respect to said pivotal axis and symmetrically with respect to said path of movement, said tool holder having a portion disposed outwardly thereon in relation to said fastening means in a given direction along said path of movement of said holder and adapted to support a tool for engagement with a work piece, of means carried by the carriage for releasably clamping said quadrant to said carriage positioned adjacent said tool supporting portion of said tool holder and engaging a part of said quadrant that is between said releasable fastening means and said tool supporting portion along said path of movement of said holder and that is spaced from said path in the direction parallel to said axis to allow movement of said holder along its path without interference with said releasable clamping means.

2. In a machine tool or the like, the combination as defined in claim 1 in which said clamping means positioned between the tool and said means for releasably fastening the quadrant to the carriage comprises an arcuate portion of limited arcuate extent carried by said quadrant and concentric with the pivotal axis of said quadrant, a clamping member of corresponding arcuate form concentric with said axis and carried upon said carriage and engaging said arcuate portion of said quadrant so as to provide for relative movement between said arcuate portion and said arcuate clamping member upon pivotal movement of said quadrant, and means for releasably effecting clamping action between said arcuate portion of said quadrant and said arcuate clamping member carried by said carriage, said arcuate portion and said arcuate clamping member and said means for effecting clamping action being disposed in the direction parallel to said pivotal axis out of said path of movement of said tool holder.

3. In a machine tool or the like, the combination as defined in claim 2 in which said means for effecting clamping action comprises a bolt extending generally parallel to said pivotal axis and engaging at one end thereof said arcuate clamping member, and means cooperating with said bolt at the opposite face of said carriage to effect clamping action between said carriage and said quadrant.

CHARLES WILLIAM BERTHIEZ.

REFERENCES CITED

The following references are of record in the file of this patent:

UNITED STATES PATENTS

| Number | Name | Date |
|---|---|---|
| 1,397,696 | Nelson | Nov. 22, 1921 |
| 1,467,182 | McCann | Sept. 4, 1923 |
| 1,637,785 | Randolph et. al. | Aug. 2, 1927 |
| 2,204,874 | Walter | June 18, 1940 |